US007087100B2

(12) United States Patent
Lewis et al.

(10) Patent No.: US 7,087,100 B2
(45) Date of Patent: Aug. 8, 2006

(54) PREPARATION OF NANOSIZED COPPER AND COPPER COMPOUNDS

(75) Inventors: Kenrick M. Lewis, Rego Park, NY (US); Hua Yu, White Plains, NY (US); Regina Nelson Eng, Pike Road, AL (US); Sabrina R. Cromer, Mount Vernon, NY (US); Chi-Lin O'Young, Poughkeepsie, NY (US); Abellard T. Mereigh, Yonkers, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/974,503

(22) Filed: Oct. 9, 2001

(65) Prior Publication Data

US 2003/0051580 A1    Mar. 20, 2003

Related U.S. Application Data

(60) Provisional application No. 60/265,153, filed on Jan. 31, 2001.

(51) Int. Cl.
*B22F 9/30* (2006.01)
*C22B 15/00* (2006.01)
*C22B 23/00* (2006.01)
*C22B 25/00* (2006.01)

(52) U.S. Cl. .................... 75/362; 423/604; 423/618; 423/594.18; 977/DIG. 1

(58) Field of Classification Search ............ 75/362, 75/345, 343; 423/604, 618, 594.18
See application file for complete search history.

(56) References Cited

U.S. PATENT DOCUMENTS

| 1,800,828 A | | 4/1931 | Furness et al. | |
|---|---|---|---|---|
| 1,867,357 A | | 7/1932 | Furness et al. | |
| 2,525,242 A | | 10/1950 | Rowe | |
| 2,666,688 A | | 1/1954 | Furness et al. | |
| RE24,324 E | | 5/1957 | Furness et al. | |
| 2,924,505 A | | 2/1960 | Page et al. | |
| 3,194,749 A | | 7/1965 | Furness et al. | |
| 3,428,731 A | | 2/1969 | Furness et al. | |
| 4,193,769 A | * | 3/1980 | Cheng et al. | 423/101 |
| 4,490,337 A | | 12/1984 | Richardson | |
| 4,539,041 A | | 9/1985 | Figlarz et al. | |
| 4,808,398 A | * | 2/1989 | Heistand, II | 423/622 |
| 4,808,406 A | | 2/1989 | Brinkman | |
| 5,023,071 A | * | 6/1991 | Sherif | 423/339 |
| 5,332,646 A | * | 7/1994 | Wright et al. | 430/137.22 |
| 5,652,192 A | * | 7/1997 | Matson et al. | 502/304 |
| 5,759,230 A | | 6/1998 | Chow et al. | |
| 5,770,172 A | * | 6/1998 | Linehan et al. | 208/420 |
| 5,951,739 A | * | 9/1999 | Klapdor et al. | 75/371 |
| 5,984,997 A | * | 11/1999 | Bickmore et al. | 75/343 |
| 6,033,624 A | * | 3/2000 | Gonsalves et al. | 419/13 |
| 6,132,491 A | | 10/2000 | Wai et al. | 75/722 |
| 6,328,947 B1 | * | 12/2001 | Monden et al. | 423/611 |
| 6,395,053 B1 | * | 5/2002 | Fau et al. | 75/362 |
| 6,517,642 B1 | * | 2/2003 | Horie et al. | 148/220 |
| 6,803,027 B1 | * | 10/2004 | Virkar et al. | 435/592.1 |

OTHER PUBLICATIONS

Dianzeng, Jia, Jianqun, Yu and Xi, Xia, Synthesis of CuO Nanometer Powder By One Step Solid State Reaction at Room Temperature, Chinese Science Bulletin, (1998), pp. 571-574, vol. 43- No. 7, CHINA.

Dhas, N. Arul, Raj, Paul C., and Gedanken, A., Synthesis, Characterization, and Properties of Metallic Copper Nanoparticles, Chem. Mater., (1998), pp. 1446-1452, vol. 10, No. 5, American Chemical Society, U.S.A.

Pileni, M. P., Reverse Micelles as Microreactors, Journal of Physical Chemistry, (1993), pp. 6961-6973, vol. 97-No. 27, FRANCE? U.S.A.?.

Zou, Bing-Suo, Tang, Guo-Qing, Zhang, Gui-Lan, Chen, Wen-Ju, Li, Tie-Jin, Zhang, Yan, and Xiao, Liang-Zhi, Preparation and Optical Properties of Cu2O Nanoparticles, Chinese Science Bulletin, (1994), pp. 14-18, vol. 39-No. 1, CHINA.

Lisiecki, I., Billoudet, F., and M. P. Pileni, Control of the Shape and the Size of Copper Metallic Particles, Journal of Physical Chemistry, (1996), pp. 4160-4166, vol. 100-No. 10, U.S.A.

Qi, Limin, Ma, Jiming, and Shen, Julin, Synthesis of Copper Nanoparticles in Nonionic Water-in-Oil Microemulsions, Journal of Colloid and Interface Science, (1997), pp. 498-500, vol. 186-No. 2, Academic Press, U.S.A.

Lyons, A.M., Nakahara, S., Marcus, M.A., Pearce, E.M. and Waszczak, J.V., Preparation of Copper-Poly(2-vinylpyridine) Nanocomposites, Journal of Physical Chemistry, (1991), pp. 1098-1105, vol. 95-No. 3, American Chemical Society, U.S.A.

(Continued)

Primary Examiner—Ngoclan T. Mai

(57) ABSTRACT

The present invention is a process for producing nanosized metal compounds. The preferred product is nanosized copper, nanosized copper (I) oxide, and nanosized copper (II) oxide. The process includes heating a copper metal precursor in a hydrocarbon preferably selected from alkylated benzenes, polyaromatic hydrocarbons, paraffins and/or naphthenic hydrocarbons. The heating is desirably at a temperature and time effective to convert, for example, the copper metal precursor to nanosized copper (II) oxide, nanosized copper (I) oxide and/or nanosized copper metal. Separation of the hydrocarbon is then performed. Recovering the solid product and recycle/reuse of the recovered hydrocarbon in subsequent preparations of nanosized metal and metal oxides may be performed. The nanosized metal oxides of the invention may additionally be converted to nanosized metal salts by reaction with the appropriate acids while dispersed in the hydrocarbons.

32 Claims, No Drawings

OTHER PUBLICATIONS

Curtis, Andrew C., Duff, Daniel G., Edwards, Peter P., Jefferson, David A., Johnson, Brian F. G., Kirkland, Angus I., and Wallace, Andrew S., A Morphology-Selective Copper Organosol, Angew. Chem. Int. Ed. Engl. (1998), pp. 1530-1533, vol. 27-No. 11, VCH Verlagsgesellschagt mbH, GERMANY.

Hirai, Hidefumi, Wakabayashi, Hidehiko, and Komiyama, Makoto, Preparation of Polymer-Protected Collodial Dispersions of Copper, Bull. Chem. Soc. Jpn., (1986), pp. 367-372, vol. 59, The Chemical Society of Japan, JAPAN.

McFadyen, Peter and Matijevic, Egon, Copper Hydrous Oxide Sols of Uniform Particle Shape and Size, Journal of Colloid and Interface Science, (1973), pp. 95-106, vol. 44-No. 1, Academic Press, U.S.A.

Fievet, Fernand, Fievet-Vincent, Francoise, Lagier, Jean-Pierre, Dumont, Bernard, and Figlarz, Michel, Controlled Nucleation and Growth of Micrometre-size Copper Particles Prepared by the Polyol Process, J. Mater. Chem.,(1993), pp. 627-632, vol. 3, FRANCE.

Kirk-Othmer Encyclopedia of Chemical Technology, Composite Materials To Detergency, Fourth Edition, pp. 505-520, vol. 7, John Wiley & Sons, U.S.A.

Brunauer, Stephen, Emmett, P. H., and Teller, Edward, Adsorption of Gases in Multimolecular Layers, (1938), pp. 309-319, vol. 60, U.S.A.

Baghurst, David R. and Mingos, D. Michael P., Microwave-Assisted Inorganic Reactions, Microwave-Enhanced Chemistry, Kingston, H. M. and Haswell, S. J. (Editors), American Chemical Society, Washington D. C., (1997), pp. 523-550, U.S.A.

Matijevic, E., Hsu, W.P., Yu, R., Preparation and Characterization of Uniform Particles of Pure and Coated Metallic Copper, Powder Technology, 63, (1990), pp. 265-275, U.S.A.

Rao, K.J., Vaidhyanathan, M.G., and Ramakrishnan, P.A., Synthesis of Inorganic Solids Using Microwaves, Chem. Mater. (1999), pp. 882-895, vol. 11, U.S.A.

Palchik, O., Zhu, J., and Gedanken, A., Microwave Assisted Preparation of Binary Oxide Nanoparticles, J. Mater. Chem. (2000), pp. 1251-1254, vol. 10, U.S.A.

* cited by examiner

PREPARATION OF NANOSIZED COPPER AND COPPER COMPOUNDS

This application claims priority from provisional U.S. Patent Application Ser. No. 60/265,153 filed on Jan. 31, 2001, which is herein incorporated by reference in its entirety.

BACKGROUND OF THE INVENTION

1. Field of the Invention

The present invention relates to a method of making nanosized metal compounds, and in particular, to a method of making nanosized copper and copper compounds useful as catalysts and pigments.

2. Description of Related Art

Nanometer sized particles have diameters in the range from about 1 nanometer ($10^{-9}$ meter) to about 100 nanometers ($10^{-7}$ meter). These materials are also described in the art as nanostructured, nanocrystalline, nanosized, nanoparticulate, nanoscale, ultrafine or superfine. Their structures and high surface to volume ratio make them desirable in catalytic, electronic, magnetic and coating (pigment) applications. Various physical and chemical methods have been disclosed in the prior art for their preparation.

Jia et al., *Chinese Science Bulletin*, 43, (1998), pp. 571–74, reported the synthesis of nanosized copper (II) oxide, CuO, by grinding a 1:2 molar mixture of $CuCl_2.2H_2O$ and NaOH in a mortar at room temperature. The CuO particles averaged 23 nanometers in diameter. However, this one step solid state reaction was not successful with $Cu(OH)_2$ as the starting material.

Dhas et al., *Chemistry of Materials*, 10, (1998), pp. 1446–52, prepared nanosized copper and copper (I) oxide by the thermal and sonochemical reduction of copper (II) hydrazine carboxylate in an aqueous medium. Thermal reduction produced irregularly shaped copper particles with dimensions of 200 to 250 nanometers. A mixture of metallic copper and copper (I) oxide was obtained by sonochemical reduction. The solid consisted of 50 to 70 nanometer aggregates of smaller nanosized particles.

Pileni, M. P., *J. Physical Chemistry*, 97, (1993), pp. 6961–73, reviewed the synthesis of nanosized copper and copper compounds in reverse microemulsions and reverse micelles. Reverse micelles and reverse microemulsions comprise formation of a discontinuous polar phase (for example, water) within a nonpolar (or low polar) continuous phase (for example, cyclohexane) in the presence of surfactants or emulsifiers. The discontinuous polar phase consists of nanosized droplets, whose dimensions vary with the polar phase to surfactant molar ratio. A soluble copper (II) compound is dissolved in the polar phase. Its reduction leads to formation of nanosized copper (I) compounds and/or nanosized copper metal. Copper (I) oxide, with 5 to 10 nanometer particles was prepared in this way by Zou et al., *Chinese Science Bulletin*, 39, (1994), pp. 14–18. Lisiecki et al., *J. Physical Chemistry*, 100, (1996), pp. 4160–4166, disclosed the control of copper particle size and dispersity by controlling the water/surfactant molar ratio. Nanoparticles 2 to 10 nanometers were obtained at molar ratios 1 to 10. Qi et al., *J. Colloid and Interface Science*, 186, (1997), pp. 498–500, also prepared 5 to 15 nanometer copper particles in reverse micelles.

Lyons et al., *J. Physical Chemistry*, 95, (1991), pp. 1098–1105, prepared 350 nanometer copper particles in poly(2-vinylpyridine) by the thermal decomposition and reduction of the polymer-copper (II) formate complex. Reduction of copper (II) acetate to micron and nanosized sized particles by hydrazine in the presence of poly(vinyl-2-pyrrolidone) and acetonitrile was disclosed by Curtis et al., *Angewandte Chemie, International Edition in English*, 27, (1988), pp. 1530–33. Hirai et al., *Bulletin Chemical Society Japan*, 59, (1986), pp. 367–372, obtained copper particles in the 500 to 1500 nanometer range by reducing copper (II) salts with sodium tetrahydroborate or hydrazine in aqueous solutions of water soluble polymers. McFadyen et al., *J. Colloid Interface Science*, 44, (1973), pp. 95–106, and Matijevic et al., *Powder Technology*, 63, (1990), pp. 265–75, reported formation of 300 to 1,600 nanometer copper oxide particles by reduction of copper tartrate with glucose in polymer-free aqueous systems.

Aside from the use of ultrasonic energy by Dhas, et al. mentioned above, these prior art disclosures have all used conventional conductive or convective heating, where necessary, to effect the synthesis of nanosized metals and metal oxides. Microwave assisted synthesis of nanosized oxides in polar solvents such as ethylene glycol was disclosed by Palchik, et al., *J. Materials Chem.*, 10 (2000) pp. 1251–1254). Baghurst, et al., *Microwave-Enhanced Chemistry*, Kingston, H. M. and Haswell, S. J. (Editors), American Chemical Society, Washington D. C., (1997), pp. 523–550, and Rao, et al., *Chemistry of Materials*, 11 (1999) pp. 882–895, have published reviews of microwave-assisted inorganic reactions, but nanosized metals and metal oxides were not emphasized.

U.S. Pat. No. 4,539,041 to Figlarz et al. which issued on Sep. 3, 1985, claims the reduction of salts, oxides, and hydroxides in polyols under reflux conditions to produce micron-sized metals and oxides (see also Figlarz, M. et al., *J. Materials Chemistry*, 3, (1996), pp. 627–32). These references show that the process occurs via the following steps: progressive or total dissolution of the oxidized metal precursor, reduction of the dissolved species by the polyol and nucleation and growth of metal particles.

U.S. Pat. No. 5,759,230 to Chow et al. which issued on Jun. 2, 1998, claims a method of forming nanocrystalline metallic powders in the 1 to 100 nanometer range by decomposing salts, oxides, and hydroxides in refluxing polyols. The precursor compounds must be substantially soluble in the reaction mixture for nanosized particles to be obtained.

These prior art procedures have all used solid state reactions or require solubilization in polar liquids such as water, acetonitrile, or polyols to produce nanosized copper and nanosized copper compounds by chemical methods. In some cases, the average size of the copper and copper oxide particles was considerably larger than the generally recognized 100 nanometer limit for nanosized particulates.

Bearing in mind the problems and deficiencies of the prior art, it is therefore an object of the present invention to provide a method for making nanosized metal compounds which overcome the deficiencies of the prior art methods, and the nanosized metal compounds prepared therefrom.

It is another object of the present invention to provide a method of making nanosized metal compounds which may have utility as catalysts and pigments without a need for solubilization of the metal precursors, and the nanosized metal compounds prepared therefrom.

A further object of the invention is to provide a method of making nanosized copper and copper compounds which may have utility as catalysts and pigments.

It is yet another object of the present invention to provide nanosized copper and copper oxides having an average particle size of less than 1000 nanometer.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for producing a solid nanosized member selected from the group consisting of nanosized metal, nanosized metal oxide, and mixtures thereof, the process comprising:
  (a) heating a metal compound in a hydrocarbon at a temperature and time effective to convert the metal compound to a solid nanosized member;
  (b) separating the hydrocarbon from the solid nanosized member; and
  (c) recovering the solid nanosized member.

The process may further include steps (d) recycling the hydrocarbon separated from the nanosized member for additional preparations of subsequent nanosized members, and (e) converting a nanosized metal oxides to nanosized metal salts by reacting with at least one acid while dispersing the metal compound in the hydrocarbon. Preferably, in step (a) the metal compound is selected from the group consisting of copper hydroxide, copper methoxide, copper formate, copper acetate, and mixtures thereof. More preferably, in step (a) the metal compound includes a metal selected from the group consisting of copper, nickel, zinc, tin, cobalt, and mixtures thereof. Alternatively, in step (a), the metal compound is a metal oxide selected from the group consisting of hydroxides, carboxylates, alkoxides, and mixtures thereof. Preferably, in step (a), the hydrocarbon is a member selected from the group consisting of alkylated benzenes, polyaromatic hydrocarbons, paraffins, and cycloparaffins. In step (a), the heating may also be microwave assisted. Susceptors which have high dielectric loss tangents may also be added to the reaction mixture. During step (a), heating the metal compound in the hydrocarbon may further comprise reacting the nanosized metal compound with a reducing agent while dispersing the metal compound in the hydrocarbon. This process may be run batchwise or continuously.

In another aspect, the present invention is directed to a nanosized metal compound made by
  (a) heating a metal precursor in a hydrocarbon at a time and temperature effective to convert the metal precursor to a solid nanosized metal compound;
  (b) separating the hydrocarbon from the solid nanosized metal compound; and
  (c) recovering the solid nanosized metal compound.

Preferably, the nanosized metal compound is a member selected from the group consisting of nanosized metal, nanosized metal oxide, and mixtures thereof having an average particle size of less than 1,000 nanometers. Preferably, the metal precursor has a metal selected from the group consisting of copper, nickel, zinc, tin, cobalt, and mixtures thereof.

In yet another aspect, the present invention is directed to a process of making nanosized copper or copper oxide comprising the steps of
  (a) providing a copper precursor selected from the group consisting of copper hydroxide, copper methoxide, copper formate, copper acetate, and mixtures thereof;
  (b) heating the copper precursor in a thermally stable hydrocarbon solvent at a temperature greater than about 150° C. for about 1 to about 24 hours; and
  (c) separating the nanosized copper or copper oxide from the hydrocarbon solvent, the nanosized copper or copper oxide having an average particle size of about 0.1 to about 600 nanometers.

Preferably, in step (b), the thermally stable solvent is selected from the group consisting of alkylated benzenes, polyaromatic hydrocarbons, paraffins, and cycloparaffins. In step (b), solubility of the copper precursor in the hydrocarbon solvent is unnecessary. The process of this aspect may further include step (d) recycling and reusing the hydrocarbon solvent. This process may be run batchwise or continuously.

In still yet another aspect, the present invention is directed to a process of making nanosized metal salts comprising the steps of:
  (a) heating a metal precursor in a hydrocarbon solvent for a time and temperature to convert the metal precursor to a nanosized metal oxide;
  (b) reacting the nanosized metal oxide with at least one acid corresponding to a desired nanosized metal salt; and
  (c) separating the nanosized metal salt from the hydrocarbon solvent.

Preferably, in step (b), the at least one acid is in gaseous form comprising hydrogen halide, hydrogen sulfide or hydrogen cyanide. This process may be run batchwise or continuously as well.

DESCRIPTION OF THE PREFERRED EMBODIMENT(S)

The present invention is directed to a method of making nanosized metal compounds having an average particle size of less than 1000 nanometers by the thermal or microwave assisted decomposition, dehydration and/or reduction of a metal precursor dispersed in a thermally stable hydrocarbon solvent with heating at temperatures greater than about 150° C. for a period of about 1 to about 24 hours. Heating may be by conventional means such as conduction or convection, as well as by microwave radiation. The resulting nanosized metal compound may be further treated in the same hydrocarbon solvent to produce nanosized metal salts. Total or progressive solubility of the metal precursor is not needed to successfully practice the present invention.

In a most preferred embodiment, the present invention discloses a process for the facile preparation of copper, copper (I) oxide, copper (II) oxide, and mixtures thereof with particle sizes of less than 1,000 nanometers, preferably in the range of about 0.1 to about 600 nanometers, more preferably in the range of about 0.1 to about 500 nanometers, and most preferably in the range of about 0.1 to about 100 nanometers. The process comprises conductive, convective or microwave assisted heating of a copper compound which may be a member of the group consisting of copper hydroxide, copper methoxide, copper formate, copper acetate, and mixtures thereof, in a hydrocarbon selected from alkylated benzenes, polyaromatic hydrocarbons, paraffins, and cycloparaffins at a temperature and time effective to convert the copper compound to nanosized copper (II) oxide, nanosized copper (I) oxide and/or nanosized copper metal. The process includes recovering the solid product, separating the hydrocarbon, for example by decantation, filtration, or centrifugation, and recycling and/or reusing the recovered hydrocarbon in additional preparations of nanosized copper and copper oxides. Total or progressive solubility of the copper precursor compound in the hydrocarbon is not necessary for the success of the process.

Copper compounds, which may be decomposed thermally to copper, copper (I) oxide, copper (II) oxide, and mixtures thereof by hydrocarbons, such as alkylated benzenes, paraffins, cycloparaffins, and polyaromatic hydrocarbons, are used to prepare the nanosized copper and nanosized copper oxides of this invention. Suitable examples of such copper precursors are copper (II) hydroxides, mixed hydrous oxides such as $3CuO \cdot Cu(OH)_2$, basic copper carbonate ($CuCO_3 \cdot Cu(OH)_2$), copper aryloxides (e.g., $Cu(OC_6H_5)_2$), copper alkoxides (e.g., $Cu(OCH_3)_2$, $[Cu(O\text{-}tC_4H_9)]_4$), carboxylates (e.g., $Cu(OOCH)$, $Cu(OOCH)_2$, $Cu(OOCCH_3)$, $Cu(OOCCH_3)_2$, $Cu(N_2H_3COO)_2$), and copper siloxides (e.g., $[CuOSiR'_3]_4$ wherein R' is methyl, ethyl, butyl, phenyl, other linear and branched hydrocarbyl groups). All polymorphic forms of copper (II) hydroxide, particularly the cubic and orthorhombic polymorphs, are preferred copper precursors of the invention.

A preferred copper compound precursor for use in the invention is preferably anhydrous, copper (II) hydroxide but material containing water of hydration is also usable. The water content of commercial copper (II) hydroxide may be as high as 20 wt. %. If the hydrated solid is used, provisions must be made in the design of the apparatus to avoid contact between the liquid water formed and condensed during the dehydration, reduction and thermal decomposition, and the hot hydrocarbon solvent.

In addition to water content, various other criteria may be used to characterize the copper (II) hydroxide and other metal precursors of this invention. BET surface area of the copper (II) hydroxide may be as low as 0.1 $m^2/g$. Areas greater than 10 $m^2/g$ are preferred. Particle size of the copper (II) hydroxide may be from less than about 1 micron up to about 100 microns. The desirable range is 0.1 to 50 microns, and the preferred range is 0.1 to 30 microns. Smaller particle size and higher surface area of the copper (II) hydroxide lead to similar desirable properties in the nanosized copper products. The preferred copper (II) hydroxide of the invention is that available from Kocide Chemical Corp. of Houston, Tex., with a copper content of about 57 to about 59 wt. % copper and a bulk density of about 171 to about 229 $kg/m^3$, available as KOCIDE® $Cu(OH)_2$. Also preferred are those copper hydroxides prepared by the methods disclosed in U.S. Pat. Nos. 1,800,828, 1,867,357, 2,525,242, 2,666,688, Re 24,324, 2,924,505, 3,194,749, 3,428,731, 4,490,337, and 4,808,406.

Trace impurities and extraneous matter present in the commercial copper (II) hydroxide will not generally be removed by the thermal decomposition in the activating hydrocarbon solvent. Thus, trace amounts of aluminum, barium, calcium, lead, phosphorus, tin, and zinc might be present in the nanosized copper and nanosized copper oxides. Tolerable and limiting quantities of the pertinent metals will depend on the intended use of the nanosized product.

Although copper (I) oxide is customarily a red to brick-red solid, the nanoparticulate copper (I) oxide produced by the method of the present invention may be black, black/brown, or yellow/brown. As is already known (see *Kirk-Othmer Encyclopedia of Chemical Technology*, Vol. 7, 4th edition, (1998), pp. 515–19), the color of copper (I) oxide is determined by its particle size. Yellow copper (I) oxide has an average particle size of about 0.4 microns, red copper (I) oxide has an average particle size of about 2.5 microns, and purple copper (I) oxide has an average particle size of about 50 microns.

However, black or brown copper (I) oxide has not been reported in the prior art. Samples of black or brown copper (I) oxide prepared by the method of the invention have about 10 to about 20 nanometer agglomerates when analyzed by high resolution scanning electron microscopy (HRSEM). Thus, the primary particles must have diameters smaller than this measurement. The smaller particle size and higher surface area of the black copper (I) oxide of the present invention afford higher dispersion when the nanosized product is used as a catalyst or catalyst precursor.

Unexpectedly, nanosized copper (II) oxide produced in accordance with the present invention is black and particulate. Experiments have produced particle sizes in the range of about 5 to about 600 nanometers depending on the hydrocarbon solvent used for the thermal decomposition. The nanosized copper metal is obtained as a reddish brown solid and as lustrous films (mirrors) coating the sides of the reaction vessel. Films are generally produced when copper carboxylates (e.g., copper (II) formate ($Cu(OOCH)_2$), copper (II) hydrazine carboxylate ($Cu(N_2H_3COO)_2$), and copper alkoxides (e.g., copper (II) methoxide, $Cu(OCH_3)_2$) are decomposed in accordance with the method of the invention. Nanoparticles of copper from 10 to 1,000 nanometers are observed experimentally.

Determination of particle size may be done by transmission electron microscopy (TEM) or high resolution scanning electron microscopy (HRSEM). Surface area measurements are made by the "BET method" described in S. Brunauer, et al., *J. American Chemical Society*, 60, (1938), pp. 309–19. Values are reported in area per unit weight, for example, square meters per gram ($m^2/g$). Identification of the nanosized solids as copper, copper (I) oxide, or copper (II) oxide may be done by electron diffraction, x-ray powder diffraction (XRD), extended x-ray absorption fine structure spectroscopy (EXAFS), and wet chemical analysis. XRD and wet chemical analysis are the two methods used in the illustrative examples of this invention. Experimentally determined XRD patterns were compared with standard compilations of two theta values ($2\theta°$) and d-spacings such as those in The Powder Diffraction Files, The National Bureau of Standards Circulars, and ASTM Files for structural identification.

The present invention is also applicable to other metals and their oxides. For example, the hydroxides, carboxylates, and alkoxides of transition metals like cobalt, nickel, zinc, and main group elements like tin, antimony, and aluminum may be decomposed thermally to their respective nanosized oxides in the hydrocarbon solvents of this invention.

In the context of the invention, hydrocarbons that are used for the dehydration, thermal or microwave assisted decomposition, and/or reduction of the metal precursors must have normal boiling points, or in the case of mixtures, initial boiling points, greater than about 150° C. They include alkylated benzenes, polyaromatic hydrocarbons, linear and branched paraffins, cycloparaffins, and petroleum distillates. They provide an excellent means of dispersing the metal precursor, provide a medium for its dehydration, thermal decomposition, and/or reduction, and facilitate the favorable nucleation and growth of the resultant nanosized metal compounds.

Suitable alkylated benzenes for the decomposition of the $Cu(OH)_2$ and other copper (II) precursors to nanosized $Cu_2O$ are dodecylbenzene, tridecylbenzene, tetradecylbenzene, dialkylated benzenes, alkylated tetralins, and their mixtures such as are sold by Sasol Chemical Industries, Ltd. of South Africa under the trade names NALKYLENE®, and ISOR-CHEM®. NALKYLENE® 550BL, NALKYLENE® 500, NALKYLENE® 550L, NALKYLENE® 600L, and ISOR-CHEM® 113 are particularly preferred hydrocarbon solvents of the present invention. SIRENE® X11L, and SIRENE® X12L, available from Ciba-Geigy of Sweden, are also preferred hydrocarbon solvents of the present invention.

Structurally, the polyaromatic hydrocarbons useful in the present invention possess two or more aromatic rings with one or more alkyl or cycloalkyl group substituents. The aromatic rings may be fused together as in naphthalene, phenanthrene, anthracene, and fluorene derivatives. They may be joined by single carbon-carbon bonds as in biphenyl and terphenyl derivatives, or they may be joined by bridging alkyl groups as in the diphenylethanes and tetraphenylbutanes. The preferred polyaromatic hydrocarbons are high temperature stable organic materials typically used as heat exchange media. Examples include THERMINOL® 59, THERMINOL® 60, and THERMINOL® 66 from Solutia, Inc., St. Louis, Mo.; DOWTHERM® HT from Dow Chemical Co., Midland, Mich.; MARLOTHERM® S and MARLOTHERM® L from Condea Chemie GmbH, Marl, Germany; and diphenyl ether having normal boiling points above 250° C. THERMINOL® 59 is a mixture of alkyl-substituted aromatic compounds recommended for use between −45 to 315° C. THERMINOL® 60 is a mixture of polyaromatic compounds with an average molecular weight of about 250. Its optimum temperature range is from −45 to 315° C. as well. THERMINOL® 66 and DOWTHERM® HT are mixtures of hydrogenated terphenyls with an average molecular weight of about 240 and a maximum temperature limit of about 370° C. MARLOTHERM® S is a mixture of isomeric dibenzylbenzenes, and MARLOTHERM® L is a mixture of isomeric benzyl toluenes. Both can be used at temperatures up to about 350° C. Especially preferred are THERMINOL® 59, THERMINOL® 66, DOWTHERM® HT, MARLOTHERM® S, and MARLOTHERM® L.

Polyaromatic hydrocarbons may also be used in the conversion of nanosized copper oxides to nanosized copper. For example, nanosized copper oxides may be produced in alkylated benzenes and subsequently reduced to nanosized copper by heating in a polyaromatic hydrocarbon at temperatures greater than 150° C. for about 1 to about 24 hours.

Cycloparaffins are also useful hydrocarbon solvents for practicing the instant invention. They are components of white mineral oils, petroleum distillates and some fuels. White mineral oils and petroleum distillates also contain normal and branched paraffins (see Debska-Chwaja, A., et al., *Soap, Cosmetics and Chemical Specialties*, (November 1994), pp. 48–52; ibid. (March 1995), pp. 64–70). Suitable examples of commercial products containing paraffins and cycloparaffins useful as hydrocarbon solvents in the present invention are the white mineral oils, CARNATION® 70, KAYDOL®, LP-100 and LP-350, and the petroleum distillates PD-23, PD-25, and PD-28, all of which are sold by Crompton Corp., Greenwich, Conn., under the WITCO® trademark. Other examples of cycloparaffins useful for the preparation of nanosized copper, copper (I) oxide, and copper (II) oxide are butylcyclohexane, decahydronaphthalene, perhydroanthracene, perhydrophenanthrene, perhydrofluorene and their alkylated derivatives, bicyclohexyl, perhydroterphenyl, perhydrobinaphthyl, and their alkylated derivatives. Normal and branched paraffins with normal boiling points greater than about 150° C. are particularly effective.

Synthesis of the nanosized metal and nanosized metal oxides is carried out in a slurry reactor at temperatures up to the boiling point of the hydrocarbon. Temperatures between about 100 to about 300° C. are effective, and those between about 150 to about 250° C. are particularly effective. The quantity of hydrocarbon used must be sufficient to disperse all of the metal precursor as the mixture is heated and stirred. High surface area precursors might require more of the hydrocarbon for good dispersion. The ratio of metal precursor to solvent required for nanosized product formation is not narrowly critical. Gravimetric ratios of precursor to hydrocarbon solvent in the range of about 1:100 to about 1:3 have yielded nanosized metal compounds satisfying the nanosize criterion of the present invention. In making nanosized copper and copper oxides, a ratio of about 1:10 to about 1:5 copper precursor to solvent is preferred. Ratios of precursor to solvent above and below this range are also expected to be effective.

The preferred solvents of this invention are hydrocarbons whose molecules have low or no polarity. Nonetheless, microwave assisted heating and precursor decomposition are still possible and effective, albeit at higher power levels even though efficient microwave heating occurs with polar molecules. Reduced power usage is facilitated by susceptors. Susceptors are solid or liquid additives, which have high dielectric loss tangents. They couple strongly with microwave radiation and permit more efficient heating of materials of low or no polarity. Susceptors must assist only with heating the reaction mixture to decomposition temperatures. They must not react with the precursors or impair the performance of the nanosized product. Suitable susceptors are amorphous carbon, graphite, boron, silicon carbide, magnetite ($Fe_3O_4$), $NaH_2PO_4.2H_2O$, and copper (II) oxide. They are effective at about 0.05 to about 5 vol. % of the hydrocarbon. It is desirable that the solid susceptors be submicron particle size.

With microwave assisted decomposition, reaction times are reduced and product composition might be different from that obtained with convective or conductive heating. For example, mixtures of nanosized $Cu_2O$ and CuO are obtained from the decomposition of $Cu(OH)_2$ in alkylated benzenes and polyaromatic hydrocarbons. With conventional heating, nanosized $Cu_2O$ is produced in the alkylated benzenes, and nanosized Cu in the polyaromatic hydrocarbons.

Laboratory and larger scale microwave devices and equipment suitable for use with the method of the instant invention are known in the art.

The method of the present invention may also include adding surface-active additives, or surfactants, to the reaction mixture during the preparation of nanosized metal compounds. The surfactants contribute to smaller particle size, higher surface area, and less sintering of the reaction solids. They also minimize any foaming which may occur. Preferably, enough of the surfactant is added at the start of the process to mitigate any foaming during the course of the reaction.

Nitrogen, argon, or another inert gas is optionally injected into the reaction mixture during the thermal or microwave assisted decomposition. If a reducing gas (e.g., hydrogen, carbon monoxide, and mixtures thereof) is introduced instead, the nanosized solid may be different from that obtained in an inert gas environment. For example, thermal decomposition of KOCIDE® $Cu(OH)_2$ from Kocide Chemical Corp., in alkylated benzenes and naphthenic hydrocarbons in nitrogen produce nanosized $Cu_2O$, whereas in hydrogen or carbon monoxide, nanosized copper is the main product. Mixtures of nanosized copper and nanosized copper (I) oxide result if the reduction is incomplete. Nanosized copper is the principal solid product from $Cu(OH)_2$ decomposition in polyaromatic hydrocarbons, like THERMINOL® 59, in both inert and reducing gas environments.

Alcohols are also effective reducing agents for the conversion of nanosized copper oxides to nanosized copper. To minimize or avoid sintering, these reductions are done by introducing alcohol vapor into a mixture of nanosized copper oxide and solvent at temperatures greater than about 100° C. Gaseous methanol and ethanol have been used in this way to generate nanosized copper having an average particle size of about 10 to about 20 nanometers from nanosized $Cu_2O$ in NALKYLENE® 550BL and THERMINOL® 59.

Following separation (e.g., by filtration, centrifugation or decantation) of the desired nanosized products from the solvent, the recovered hydrocarbon may be used again in subsequent preparations of nanosized compounds. The solid nanosized product may be used without additional treatment, or it may be washed with a solvent (e.g., toluene or methanol) and dried before characterization, analysis, or use.

Nanosized metal oxides may be converted to other nanosized derivatives in the same hydrocarbon solvents used for their preparation. Thus, reaction of nanosized copper (I) oxide or copper (II) oxide with hydrogen halides, hydrogen sulfide, and hydrogen cyanide, all preferably in gaseous form, produces the corresponding nanosized copper compounds. For example, nanosized copper (I) chloride results from the reaction of nanosized copper (I) oxide and gaseous hydrogen chloride, and nanosized copper (I) cyanide from its reaction with hydrogen cyanide. Copper films and mirrors are formed when the nanosized copper oxides are treated with formic acid and heated above 180° C. to decompose the formate.

The nanosized solids described herein are useful for many applications. For example, nanosized copper and copper oxides are excellent catalyst precursors for the Direct Synthesis of trialkoxysilanes and alkylhalosilanes. Nanosized zinc oxide and nanosized tin oxide are effective promoters of diorganodihalosilane formation in the Rochow-Müller Direct Synthesis.

EXAMPLES

The following examples illustrate the preferred embodiments of the invention. They are not intended to limit the scope of the invention. Instead, they are presented to facilitate the practice of the invention by those of ordinary skill in the art.

TABLE I

List of Abbreviations Used

| ABBREVIATION | MEANING | ABBREVIATION | MEANING |
|---|---|---|---|
| g | gram | XRD | X-ray diffraction |
| $kg/m^3$ | kilograms per cubic meter | HRSEM | High resolution scanning electron microscopy |
| nm | nanometer | TEM | Transmission electron microscopy |
| μm | micron (micrometer) | FTIR | Fourier transform infrared spectroscopy |
| $m^2/g$ | square meters per gram | GC | Gas Chromatography |
| T59 | THERMINOL® 59 | GC/MS | Gas Chromatography/ Mass Spectrometry |
| N550BL | NALKYLENE® 550BL | | |

TABLE II

List of Materials Used

| RAW MATERIAL | SUPPLIER | RAW MATERIAL | SUPPLIER |
|---|---|---|---|
| NALKYLENE® 500 | Vista | $Cu(OH)_2$ | Kocide Chemical |
| NALKYLENE® 501 | Vista | $Cu(OH)_2 \cdot 2H_2O$ | Kocide Chemical |
| NALKYLENE® 550BL | Vista | $Cu(OH)_2$ | Bernard Chimie |
| NALKYLENE® 600L | Vista | $Cu(OCH_3)_2$ | Aldrich |
| NALKYLENE® V-7050 | Vista | $Cu(OC_2H_5)_3$ | Aldrich |
| SIRENE® X12L | Condea | $CuCO_3 \cdot Cu(OH)_2$ | Aldrich |
| ISORCHEM® 113 | Condea | $Cu(O_2CCH_3)_2 \cdot H_2O$ | Aldrich |
| THERMINOL® 59 | Monsanto | CuO | Alfa Aesar |
| CARNATION® 70 | Crompton | $Cu_2O$ | Fisher Scientific |
| WITCO® LP-100 | Crompton | Cu | Fisher Scientific |
| WITCO® LP-350 | Crompton | $Ni(OH)_2$ | Alfa Aesar |
| WITCO® KAYDOL® | Crompton | $Co(OH)_2$ | Alfa Aesar |
| WITCO® PD-23 | Crompton | $Co(OOCCH_3)_2$ | Alfa Aesar |
| Ethanol | Aarper | $Zn(OOCH)_2 \cdot H_2O$ | Lab synthesis |
| Methanol | Aldrich | $Sn(OOCH)_2$ | Lab synthesis |
| Ethylene Glycol | Aldrich | Sorbitol | Aldrich |

Examples 1A to 1J

These examples illustrate the preparation of nanoparticulate copper (I) oxide, $Cu_2O$, via the thermal decomposition and reduction of copper (II) hydroxide in alkylated benzenes. KOCIDE® copper (II) hydroxide containing 57 to 59 wt. % copper having a bulk density of 171 to 229 $kg/m^3$ was used. It is available from Kocide Chemical Industries.

The synthesis was performed in a three-necked round bottom flask fitted with a mechanical stirrer, Friedrich condenser, temperature-controlled heating mantle and a tube for the ingress of nitrogen. The flow of nitrogen was sufficient to displace water vapor and other volatile by-products from the reaction headspace without simultaneously evaporating the alkylated benzene from the hot reaction mixture. Coolant was not circulated in the condenser because the water droplets popped explosively on contact with the hot hydrocarbon.

Quantities of the raw materials used are reported in Table III.

TABLE III

Quantities Of KOCIDE ® Cu(OH)$_2$ and Alkylated Benzenes Used to Prepare Nanosized Cu$_2$O

| EX | ALKYLATED BENZENE | AMOUNT (g) | Cu(OH)$_2$ (g) | SOLID PRODUCT (g) |
|---|---|---|---|---|
| 1A | NALKYLENE ® 500 | 253.0 | 7.14 | 5.8 |
| 1B | NALKYLENE ® 550BL | 352.5 | 50.4 | 41.0 |
| 1C | NALKYLENE ® 600L | 210.0 | 2.0 | 1.6 |
| 1D | NALKYLENE ® 501 | 253.9 | 7.05 | 5.9 |
| 1E | NALKYLENE ® 550L | 246.5 | 7.22 | 5.6 |
| 1F | ISORCHEM ® 113 | 257.3 | 7.3 | 5.7 |
| 1G | SIRENE ® X12L | 251.4 | 7.28 | 5.4 |
| 1H | NALKYLENE ® 7050 | 255.0 | 7.44 | 5.7 |
| 1J | NALKYLENE ® 500 | 245.2 | 7.04 | 5.1 |

The KOCIDE® copper (II) hydroxide and the alkylated benzene were stirred vigorously and heated to 230 to 250° C. Stirring and nitrogen flow were continued while the mixture was cooled to room temperature. Stirring was then discontinued to allow solid/liquid phase separation. The liquid, now yellow, was removed by decantation or by pipette. The solid was slurried with methanol, which was also removed by decantation or by pipette from the settled mixture. This washing procedure was repeated twice. The wet solids were then transferred to a crystallizing dish and dried in vacuo at room temperature. Dried solids were either black, brown, or yellowish brown. They were characterized by x-ray powder diffraction (XRD), optical microscopy, high resolution scanning electron microscopy (HRSEM), transmission electron microscopy (TEM), x-ray photoelectron spectroscopy (XPS), BET surface area measurement, and wet chemical analysis.

The experiment of Example 1J was performed with NALKYLENE® 500, which had been recovered from an experiment similar to that of Example 1A.

XRD data (see Table IV) showed that the solids prepared in the experiments of Example 1 were all mainly, or exclusively, copper (I) oxide, Cu$_2$O. The peaks were broader than those in the spectrum of a standard sample of brick-red, commercial Cu$_2$O. This and the unusual black or brown color indicated very small particle size. Particle sizes determined by HRSEM are summarized in Table V. It is clear that the solids were all nanosized. In many cases, the particle size distributions were quite narrow. When treated with concentrated HNO$_3$, all of the solids gave a green solution but no evolution of gas. With concentrated H$_2$SO$_4$, a copper precipitate and a blue solution were observed. These qualitative tests confirm the presence of Cu$_2$O.

TABLE IV

XRD Characterization of Solid Products of Examples 1A to 1J

| EX | XRD* (2 θ° values) | ASSIGNMENTS |
|---|---|---|
| 1A | (29.76), (36.57), (42.51) | Cu$_2$O |
| 1B | (29.79), (36.62), 38.87, (42.40), 48.93 | Principally Cu$_2$O; CuO minor. |
| 1C | (29.75), (36.64), (42.35), (61.30) | Cu$_2$O |
| 1D | (29.61), (36.51), (42.44) | Cu$_2$O |
| 1E | (29.82), (36.63), (42.55), 43.54, 50.64 | Principally Cu$_2$O; Cu minor. |
| 1F | (29.79), (36.60), 38.98, (42.49) | Principally Cu$_2$O; CuO minor. |
| 1G | (29.69), 33.46, (36.51), (42.44), 43.47, 50.58 | Principally Cu$_2$O; Cu minor. |
| 1H | (29.73), (36.67), (42.38), 43.47, 50.58 | Principally Cu$_2$O; Cu present. |
| 1J | (29.73), (36.60), 38.91, (42.49), (52.55) | Principally Cu$_2$O; CuO trace. |

(*Reflections of principal phase present shown in ( ) in this and other tables)

TABLE V

HRSEM and TEM Characterization of Solid Products of Examples 1A to 1J

| EX | COMPONENTS | PARTICLE SIZES |
|---|---|---|
| 1A | Cu$_2$O | 20–50 nm round particles. |
| 1B | Principally Cu$_2$O; CuO minor. | 30–60 nm round particles. |
| 1C | Cu$_2$O | Largest feature~60 nm. |
| 1D | Cu$_2$O | Fibers comprised of 10–30 nm round particles. |
| 1E | Principally Cu$_2$O; Cu minor. | 15–20 nm nodules. Some are agglomerated into larger masses. |
| 1F | Principally Cu$_2$O; CuO minor. | 20–100 nm round particles. |
| 1G | Principally Cu$_2$O; Cu minor. | 20–50 nm round particles. |
| 1H | Principally Cu$_2$O; Cu present. | 10–50 nm round particles joined in fibers. |
| 1J | Principally Cu$_2$O; CuO trace. | 20–100 nm round particles. |

BET surface area measured for the nanosized solid from Example 1B was 49.08 m$^2$/g. This was an approximately 30% increase over that of the Cu(OH)$_2$ raw material used.

The results of Example 1J illustrate that the hydrocarbon may be reused to prepare more nanosized copper (I) oxide.

Examples 2A to 2G

These examples illustrate the preparation of nanoparticulate copper, nanoparticulate copper (I) oxide, and nanoparticulate copper (II) oxide via the thermal decomposition and reduction of KOCIDE® copper (II) hydroxide in naphthenic hydrocarbons. The hydroxide contained 57 to 59 wt. % copper and had a bulk density of 171 to 229 kg/m$^3$.

The procedure followed was that described in Example 1, except that the final temperature of the decomposition was not 250° C. in all of the experiments. The temperatures, the naphthenic hydrocarbons and the amounts used are listed in Table VI. The results of product characterization are set forth in Tables VII and VIII.

Treatment of the solids from Examples 2A to 2D with concentrated HNO$_3$, produced green solutions (Cu(NO$_3$)$_2$) but no gas evolution. This result indicated that the solids were primarily or exclusively oxides and not metallic copper.

TABLE VI

Quantities Of KOCIDE ® Cu(OH)$_2$ and Naphthenic Hydrocarbons Used to Prepare Nanosized Cu$_2$O and CuO

| EX #, ° C. | NAPHTHENIC HYDROCARBON | AMOUNT (g) | Cu(OH)$_2$ (g) | SOLID PRODUCT (g) |
|---|---|---|---|---|
| 2A, 180° C. | Decalin | 103.7 | 5.12 | 4.1 |
| 2B, 215° C. | Dicyclohexyl | 100 | 5.07 | 3.7 |
| 2C, 170° C. | Butylcyclohexane | 100.1 | 5.01 | 3.8 |
| 2D, 250° C. | CARNATION ® 70 | 251.9 | 7.2 | 4.5 |
| 2E, 250° C. | WITCO ® LP 100 | 150.1 | 2.15 | 1.1 |
| 2F, 250° C. | WITCO ® LP 350 | 190 | 2.20 | 1.1 |
| 2G, 250° C. | KAYDOL ® | 130.2 | 2.01 | 1.0 |

XRD data support this conclusion which shows that only dehydration of Cu(OH)$_2$ to CuO occurred in some naphthenic hydrocarbons (Examples 2A to 2C), whereas dehydration and reduction to Cu$_2$O and/or Cu occurred in others (2D to 2G). HRSEM showed all of the solids measured to be nanosized (Table VIII). Reuse of the recovered solvents in the preparation of more nanosized copper oxides was also demonstrated.

TABLE VII

XRD Characterization of Solid Products of Examples 2A to 2G

| EX | XRD* (2 θ° values) | ASSIGNMENTS |
|---|---|---|
| 2A | (35.77), (38.77), (48.93) | CuO |
| 2B | (35.89), (38.99) | CuO |
| 2C | 16.84, 24.01, 34.06, (35.89), (38.87), (48.93) | CuO |
| 2D | (36.53), 38.99, (42.40), 48.93 | Principally Cu$_2$O; CuO minor. |
| 2E | (29.79), (36.45), (42.51), 43.52, 50.55, 61.38 | Principally Cu$_2$O; Cu minor. |
| 2F | (29.76), (36.45), (42.50), 43.50, 50.51, 61.35 | Principally Cu$_2$O; Cu minor. |
| 2G | (29.79), (36.45), (42.51), 43.52, 50.55, 61.38 | Principally Cu$_2$O; Cu minor. |

TABLE VIII

HRSEM Characterizations of Solid Products of Examples 2A to 2G

| EX | NAPHTHENIC HYDROCARBON | PARTICLE SIZE |
|---|---|---|
| 2A | Decalin | 100–600 nm fibers comprised of linked nanosized platelets. |
| 2B | Dicyclohexyl | Nanosized fibers~100 nm and round particles 5–10 nm. |
| 2C | Butylcyclohexane | 20–400 nm fibers comprised of linked 10–15 nm particles |
| 2D | CARNATION ® 70 | Fibers comprised of 1–15 nm round particles. |
| 2E | WITCO ® LP-100 | not measured |
| 2F | WITCO ® LP-350 | not measured |
| 2G | KAYDOL ® | not measured |

Examples 3A to 3D

These examples illustrate the preparation of nanoparticulate copper (I) oxide and nanoparticulate copper (II) oxide via the thermal decomposition and reduction of KOCIDE® copper (II) hydroxide in paraffinic hydrocarbons and petroleum distillates. The hydroxide contained 57 to 59 wt. % copper and had a bulk density of 171 to 229 kg/m³.

The procedure followed was that described in Example 1, except that the final decomposition temperature was not 250° C. in all the experiments. The temperatures and the amounts of decane, dodecane, tetradecane, and petroleum distillate WITCO® PD-23 used are listed in Table IX. The results of product characterization are set forth in Tables X and XI. The copper oxides formed were all nanosized.

TABLE IX

Quantities Of KOCIDE ® Cu(OH)$_2$ and Paraffinic Hydrocarbons and Petroleum Distillates Used to Prepare Nanosized Cu$_2$O and CuO

| EX #, ° C. | HYDROCARBON | AMOUNT (g) | Cu(OH)$_2$ (g) | SOLID PRODUCT (g) |
|---|---|---|---|---|
| 3A, 165° C. | Decane | 101.7 | 5.17 | 3.18 |
| 3B, 200° C. | Dodecane | 103.1 | 5.02 | 3.34 |
| 3C, 245° C. | Tetradecane | 101.9 | 5.05 | 3.46 |
| 3D, 250° C. | WITCO ® PD-23 | 100.1 | 5.20 | 3.19 |

TABLE X

XRD Characterization of Solids from Examples 3A to 3D

| EX | XRD (2 θ° values) | ASSIGNMENTS |
|---|---|---|
| 3A | (35.67), (38.77), (48.82) | CuO |
| 3B | (35.67), (38.87), (48.82) | CuO |
| 3C | (36.42), (38.87), (42.74), (49.16) | CuO and Cu$_2$O approximately equal. |
| 3D | (36.53), 38.87, (42.40), 50.55 | Principally Cu$_2$O; CuO and Cu minor. |

TABLE XI

HRSEM Characterization of Solid Products of Examples 3A to 3D

| EX | HYDROCARBON | PARTICLE SIZE |
|---|---|---|
| 3A | Decane | 400–600 nm needles comprised of linked 10–12 nm platelets. |
| 3B | Dodecane | 300–600 nm fibers comprised of 10–12 nm platelets. |
| 3C | Tetradecane | Fibers and needles comprised of 1–10 nm round particles. |
| 3D | WITCO ® PD-23 | Fibers comprised of 10–50 nm round particles. |

Example 4

This example illustrates the preparation of nanoparticulate copper by the thermal decomposition and reduction of KOCIDE® Cu(OH)$_2$ in polyaromatic hydrocarbons. The hydroxide contained 57 to 59 wt. % copper and had a bulk density of 171 to 229 kg/m³.

The procedure followed was that described in Example 1. 210 g of THERMINOL® 59 and 2.5 g of the aforementioned Cu(OH)2 were used. A reddish brown solid was produced. The XRD pattern showed reflections at two theta values, 43.52° and 50.52°. Treatment of the solid with concentrated HNO$_3$ produced a dense, yellowish brown gas, (N$_2$O$_4$), and a green solution (Cu(NO$_3$)$_2$). Similar observations were made when an authentic sample of metallic copper was tested with concentrated HNO$_3$. Thus, in contrast to its behavior in the alkylated benzenes, cycloparaffins, and paraffinic hydrocarbons, Cu(OH)$_2$ decomposes to nanosized copper in THERMINOL® 59. More nanosized copper was prepared by heating $Cu(OH)_2$ with recovered THERMINOL® 59.

Examples 5A to 5F

These examples illustrate the preparation of copper nanoparticulate films and mirrors by the thermal decomposition of copper (II) formate in hydrocarbons. The hydrocarbons were selected from the alkylated benzenes (NALKYLENE® 550BL, Example 5A), the polyaromatics (THERMINOL® 59, Example 5B) and the cycloparaffins (WITCO® CARNATION® 70, KAYDOL®, LP-100, LP-350, Examples 5C to 5E, respectively).

In the five separate experiments, Examples 5A to 5E, approximately 1 gram of anhydrous copper (II) formate (prepared by room temperature dehydration, in vacuo, of the tetrahydrate, according to Galwey, A. K., et al., *J. Physical Chem.*, 78 (1974) p. 2664), was mixed with about 100 grams of each hydrocarbon and heated to 250° C. as described in the procedure of Example 1. A lustrous, copper mirror adhered to the walls of the flask in each case. Treatment of the films with concentrated $HNO_3$ resulted in the formation of a brown gas ($N_2O_4$) and a green solution, $Cu(NO_3)_2$, in residual nitric acid.

In Example 5F, nanosized $Cu_2O$ was prepared as in Example 1B and, without separation of the solid, the cooled suspension was treated with 5 g formic acid (90% HCOOH) at 23° C. and then heated to 250° C. Nitrogen flow was maintained throughout. A copper mirror was deposited on the walls of the flask at temperatures greater than about 170° C. The XRD pattern of the recovered solid showed its most reflections at two theta values, 43.45° and 50.52°. Less intense reflections occurred at 29.75°, 36.55°, and 42.40°. These data indicate a mixture of copper and copper (I) oxide, with copper as the majority ingredient.

Examples 6A to 6D

These examples illustrate the preparation of nanosized copper, nanosized copper (I) oxide, and nanosized copper (II) oxide by the thermal decomposition of copper (II) alkoxides in THERMINOL® 59 and NALKYLENE® 500.

The preparations were performed as described in Example 1 with the quantities of raw materials listed in Table XII. Bright copper mirrors were deposited in the reaction flasks used in the experiments of Examples 6A and 6C. A reddish brown solid was produced in the experiment of Example 6B. The solid from the experiment of Example 6D was yellow. The XRD data (Table XIII) show that copper was the principal product of thermal decomposition of copper (II) methoxide both in THERMINOL® 59 (Example 6A) and in NALKYLENE® 500 (Example 6B). In THERMINOL® 59, copper (II) ethoxide produced a mixture of copper metal and copper oxides (Example 6C). Most of the metallic copper was present as a mirror on the walls of the reaction flask. The yellow solid obtained from the decomposition in NALKYLENE® 500 (Example 6D) was essentially $Cu_2O$. All the XRD patterns showed broad peaks indicative of small particle size. Qualitative tests of the solids with concentrated $HNO_3$ and $H_2SO_4$ supported the assignments made by XRD.

TABLE XII

Copper Alkoxides and Hydrocarbons Used to Prepare Nanosized Copper and Copper Oxides

| EX | COPPER ALKOXIDE | AMOUNT (g) | HYDROCARBON | AMOUNT (g) | SOLID PRODUCT |
|---|---|---|---|---|---|
| 6A | $Cu(OCH_3)_2$ | 5.06 | THERMINOL® 59 | 253.0 | Copper mirror |
| 6B | $Cu(OCH_3)_2$ | 5.04 | NALKYLENE® 500 | 252.7 | Reddish brown |
| 6C | $Cu(OCH_2CH_3)_2$ | 5.08 | THERMINOL® 59 | 251.2 | Copper mirror |
| 6D | $Cu(OCH_2CH_3)_2$ | 5.06 | NALKYLENE® 500 | 253.3 | Yellow |

TABLE XIII

XRD Characterization of Products from Thermal Decomposition of Copper Alkoxides in Hydrocarbons

| EX | XRD (2 θ° values) | ASSIGNMENT |
|---|---|---|
| 6A | 36.62, (43.49), (50.64) | Primarily Cu. Cu2O minor. |
| 6B | (43.40), (50.55) | Cu |
| 6C | 16.45, (32.64), (36.54), 39.91, (42.46), 43.45, 50.73 | Mainly Cu2O. CuO and Cu minor. |
| 6D | (29.63), 32.55, 35.66, (36.42), 38.87, (42.26) | Mainly $Cu_2O$. CuO minor. |

Particle sizes of the solids were determined by HRSEM. The solid from Example 6A had round particles of 20 to 50 nanometers, whereas that from Example 6B showed a bimodal distribution. The larger particles were 200 to 300 nanometers, and the smaller particles were 50 to 150 nanometers. The particles from Example 6C ranged between 20 to 85 nanometers.

Examples 7A to 7D

These examples illustrate the preparation of nanosized copper and nanosized copper oxides by the thermal decomposition of hydrated copper (II) hydroxide containing 62.5 to 62.8 wt. % copper and having a density of 1,048 to 1,239 $kg/m^3$. $Cu(OH)_2$ used in Examples 7A and 7B was obtained from Bernard Chimie. That used in Examples 7C and 7D was KOCIDE® $Cu(OH)_2$ hydrate.

The procedure of Example 1 was followed using the quantities of raw materials set forth in Table XIV. The solids obtained from the experiments of Examples 7A, 7B, and 7C were black. That from Example 7D was yellowish brown. Characterization data are summarized in Table XV.

TABLE XIV

Summary of Thermal Decomposition Experiments with High Density $Cu(OH)_2$ in Hydrocarbons

| EX | $Cu(OH)_2$, (g) | HYDROCARBON | AMOUNT (g) | SOLID PRODUCT |
|---|---|---|---|---|
| 7A | 8.3 | THERMINOL® 59 | 150 | CuO and $Cu_2O$. |
| 7B | 8.3 | NALKYLENE® 550BL | 130 | CuO and $Cu_2O$. |
| 7C | 7.17 | THERMINOL® 59 | 252.3 | Mainly $Cu_2O$; Cu minor. |
| 7D | 7.15 | NALKYLENE® 500 | 250.7 | $Cu_2O$ |

TABLE XV

XRD And HRSEM Characterization of Nanosized Copper Oxides of Examples 7A to 7D

| EX | XRD (2 θ° values) | PARTICLE SIZE |
|---|---|---|
| 7A | (29.79), (32.56), (35.67), (36.65), (38.89), (42.45), (48.90) | not measured |
| 7B | 29.79, (32.51), (35.77), 36.53, (38.85), 42.40, (48.90) | not measured |
| 7C | (29.79), (36.62), (42.51), 43.47, 50.55 | uniform~20 nm |
| 7D | (29.79), (36.53), (42.40) | uniform~19 nm |

All of the XRD patterns showed broad peaks. Particles $Cu_2O$ from the thermal decomposition of KOCIDE® $Cu(OH)_2$ hydrate (Examples 7C, 7D), were arranged in rows around a central axis like "corn on the cob." They were very uniform in size.

Example 9

This Example illustrates the preparation of nanosized copper (I) oxide by thermal decomposition of basic copper carbonate ($CuCO_3.Cu(OH)_2$) in NALKYLENE® 500.

7.98 g $CuCO_3.Cu(OH)_2$ from Aldrich Chemical Co. was mixed with 268.1 g NALKYLENE® 500 and heated to 250° C. using the apparatus and method described in Example 1. The initially light green color changed to dark green at 210° C. At 240° C., the mixture appeared dark brown. 5.0 g solid was recovered after the cooled slurry was filtered and the precipitate washed with methanol and dried.

$Cu_2O$ was the only component identified by XRD. The peaks in the pattern were broad. Particle sizes determined by HRSEM were 10 to 20 nanometers.

Examples 10A to 10J

These examples illustrate the preparation of nanosized copper and mixtures of nanosized copper and nanosized copper (I) oxide by the reduction of KOCIDE® $Cu(OH)_2$ (57 to 59 wt. % Cu), with $H_2$ and CO in alkylated benzenes and naphthenic hydrocarbons.

The experiments were performed as described in Example 1, except that hydrogen gas (Examples 10A to 10E) or carbon monoxide (Examples 10F to 10J) was used in place of nitrogen. The quantities of hydrocarbon solvent and $Cu(OH)_2$ used in the experiments are set forth in Table XVI.

TABLE XVI

Reduction of $Cu(OH)_2$ in Alkylated Benzenes and Cycloparaffins

| EX | $Cu(OH)_2$ (g) | HYDROCARBON | AMOUNT (g) | NANOSIZED PRODUCT |
|---|---|---|---|---|
| 10A | 2.02 | NALKYLENE® 550BL | 158 | Cu, trace $Cu_2O$ |
| 10B | 2.14 | KAYDOL® 118 | 118 | Cu, trace $Cu_2O$ |
| 10C | 2.00 | WITCO® LP 100 | 108 | Cu, trace $Cu_2O$ |
| 10D | 2.02 | WITCO® LP 350 | 131 | Cu, trace $Cu_2O$ |
| 10E | 2.39 | CARNATION® 70 | 141 | Cu only |
| 10F | 2.77 | NALKYLENE® 550BL | 147 | $Cu_2O$, Cu |
| 10G | 1.58 | KAYDOL® 122 | 122 | $Cu_2O$, Cu |
| 10H | 1.85 | WITCO® LP 100 | 131 | $Cu_2O$, Cu |
| 10I | 1.65 | WITCO® LP 350 | 124 | $Cu_2O$, Cu |
| 10J | 2.71 | CARNATION® 70 | 134 | $Cu_2O$, Cu |

XRD of the solids revealed broad peaks in all cases. As shown in Table XVI, nanosized copper was the principal product of hydrogen reduction. Small amounts of $Cu_2O$ were apparent in the samples of Examples 10A to 10D. While the solids of Examples 10A to 10E were copper-colored, those of Examples 10F to 10J were mixtures of black and copper-colored materials. Carbon monoxide reduction of $Cu(OH)_2$ in the alkylated benzenes and cycloparaffins produced mixtures of nanosized copper and nanosized copper (I) oxide under the reaction conditions used.

Examples 11A to 11E

These examples illustrate the reduction of KOCIDE® $Cu(OH)_2$ to nanosized copper (I) oxide to nanosized copper by gaseous methanol and ethanol and by polyaromatic hydrocarbons like THERMINOL®. $Cu(OH)_2$ was dispersed in THERMINOL® 59 or NALKYLENE® 550BL and agitated at 800 to 900 rpm with heating to the temperatures shown in Table XVII. 0.82 g foam control agent (FS1265, 1000 cSt.) was added in each experiment. The alcohols were pumped and vaporized at the rate of about 5 g/min and for the times shown in Table XVII. Gas samples of the reactor effluent and condensed liquid samples were taken at intervals for FTIR, GC and GC/MS analyses. After alcohol flow was discontinued and the reaction mixture cooled to room temperature, the suspension was centrifuged and the solids recovered for characterization by XRD and HRSEM or TEM. Example 11E represents three separate experiments in which nanosized copper (I) oxide, THERMINOL® 59 and nitrogen were heated together, in the absence of alcohol vapor, at 250° C. for 1, 5 and 12 hours, respectively.

TABLE XVII

Materials and Conditions Used in the Experiments of Examples 11A to 11E

| EX | SUBSTRATE | AMOUNT (g) | SOLVENT | AMOUNT (g) | ALCOHOL (g/min) | ° C./hour |
|---|---|---|---|---|---|---|
| 11A | nano $Cu_2O$, | 14.7 | T59 | 2.12 | $CH_3OH$, 5.13 | 250°/2 |
| 11B | nano $Cu_2O$, | 7.05 | N550BL | 2.03 | $CH_3OH$, 5.4 | 250°/2 |
| 11C | $Cu(OH)_2$, | 7.38 | T59 | 2.12 | $CH_3OH$, 5.13 | 170–250°/3 |
| 11D | $Cu(OH)_2$, | 7.32 | T59 | 2.12 | $C_2H_5OH$, 5.13 | 220°/2 180°/2 |
| 11E | nano $Cu_2O$, | 7.54 | T59 | 2.06 | None | 250°/1, 5, 12 |

Spectroscopic and chromatographic data for the gas and liquid samples of Examples 11A and 11B showed that formaldehyde (HCHO), water ($H_2O$) and dimethyl ether (($CH_3$)$_2$O) were formed when nanosized $Cu_2O$ was reacted with methanol at 250° C. Formaldehyde concentration decreased with time, whereas dimethyl ether appeared to increase. Solids from both experiments were copper colored and was shown by XRD to be elemental copper (2θ° values, 43.36° and 50.43°). When the experiment of Example 11B was terminated after one hour, the XRD pattern of the solid indicated the presence of both copper and copper (I) oxide.

In Example 11C, methanol vapor was introduced at 170° C., which is approximately the temperature at which decomposition and reduction of $Cu(OH)_2$ began in THERMINOL® 59. Heating to 250° C. for about 80 minutes continued during methanol vapor injection. In addition to HCHO, $H_2O$, and ($CH_3$)$_2$O, methyl formate ($HCOOCH_3$) and dimethoxymethane ($H_2C(OCH_3)_2$) were also detected by GC/MS analysis of the gas and liquid samples of this experiment. XRD of the solid product and qualitative testing with concentrated $HNO_3$ showed that it was elemental copper.

In the experiment of Example 11D, the ethanol vapor was injected for two hours with the reactor temperature at 220° C. Ethanol flow was then discontinued and the reactor was cooled to 180° C. but not at 170° C. XRD of the solid product and qualitative testing with concentrated $HNO_3$ showed that it was elemental copper.

The three solid samples recovered from the experiments of Example 11E were subjected to XRD and qualitative testing with concentrated $HNO_3$. Samples heated for one and five hours were still unchanged, black nanosized $Cu_2O$. The largest particles in the TEM were 15 to 20 nanometers. However, the solid from the 12 hour experiment was nanosized copper. Analysis by TEM showed a narrow distribution of 40 to 60 nanometer particles. Peaks in the XRD patterns of all the solids recovered in Examples 11A to 11E were broad and indicative of very fine particle size.

reaction mixture was added to a few milliliters of acetonitrile in a test tube. The bulk of the sample dissolved to give a yellow solution. A tiny amount of dark particles remained at the bottom of the tube. A similar test with the nanosized $Cu_2O$ gave a cloudy suspension with essentially all of the solid undissolved. Nitrogen flow replaced the HCl and this was continued for 30 minutes. The reaction mixture was added to 0.2 L toluene and then filtered through a Schlenk funnel. The solid was washed with another two aliquots of toluene. All of the toluene used was previously saturated with dry nitrogen. A nitrogen atmosphere was maintained in the funnel throughout the filtration. After the washings, the solid appeared tan (straw colored). It was left in the funnel and dried in vacuo at room temperature for eight hours. The solid was characterized by XRD, HRSEM and wet chemical analysis.

XRD of the solid product was very different from that of the nanosized $Cu_2O$ used as the starting material. Principal reflections were observed at the following 2θ ° values: 15.92°, 21.72°, 28.24°, and 47.18°. This pattern and the intensity distribution confirmed that CuCl was the product. The HRSEM data revealed an average particle size of 50 nanometers. Thus, nanosized $Cu_2O$ was reacted with HCl to form nanosized CuCl in an alkylated benzene solvent.

Examples 13A to 13D

These examples describe the preparation of the following nanosized solids by the method of the present invention: nickel oxide, cobalt oxide, zinc oxide and tin oxide.

Table XVIII sets forth the raw materials, hydrocarbons and thermal decomposition conditions employed in preparing the cited nanosized oxides.

Characterization data is summarized in Table XIX. Peaks in the XRD patterns of nanosized NiO (Example 13A) and nanosized CoO (Example 13B) were quite broad, indicating thereby the superfine nature of the solids.

TABLE XVIII

Reagents and Conditions Used in Examples 13A to 13D

| EX | METAL PRECURSOR | AMOUNT (g) | HYDROCARBON | AMOUNT (g) | ° C./h |
|---|---|---|---|---|---|
| 13A | Ni(OH)$_2$ | 7.83 | NALKYLENE ® 500 | 265.2 | 250° C./100 h |
| 13B | Co(OH)$_2$ | 10.39 | NALKYLENE ® 500 | 270.0 | 250° C./1 h |
| 13C | Zn(OOCH)$_2$ | 10.0 | NALKYLENE ® 500 | 250.0 | 250° C./1 h |
| 13D | Sn(OOCH)$_2$ | 10.0 | NALKYLENE ® 500 | 250.0 | 250° C./1 h |

Example 12

This example illustrates the preparation of nanosized CuCl from nanosized $Cu_2O$ synthesized as described in Example 1B.

A three-necked round bottom flask was fitted with a mechanical stirrer, gas sparge tube, and gas outlet tube. The sparge tube was connected to an HCl cylinder. A T-connection at the inlet to the sparge tube allowed the supply of dry nitrogen from another cylinder. The outlet tube from the flask was directed into a beaker of water so that unreacted HCl could be absorbed therein.

10.35 grams of nanosized $Cu_2O$ and 100 grams of NALKYLENE® 500 were mixed vigorously while HCl was introduced at 0.36 L/min for 90 minutes. As a test for the completion of the conversion to CuCl, a sample of the

TABLE XIX

Characterization of Solids from Examples 13A to 13D

| EX | XRD (2 θ° values) | HRSEM RESULTS |
|---|---|---|
| 13A | NiO (37.25), (43.21) | 40–50 nm hexagonal plates |
| 13B | CoO (36.65), (42.51) | 10–40 μ porous, friable spheres of 150–170 nm hexagonal plates |
| 13C | ZnO (31.81), (34.47), (36.25), (47.57), (56.67) | 10–100 nm hexagonal prisms |
| 13D | SnO (18.36), (29.94), (33.43), (37.22), (47.91), (50.79), (57.40) | ~5 μ slabs plus smaller micron-sized and 100–300 nm fragments |

Examples 14A to 14I (Comparative Examples)

These examples illustrate the preparation of nanosized and submicron nickel, copper and copper oxides according to the methods of Figlarz et al., *J. Materials Chemistry*, 3, pp. 627–32 (1996), U.S. Pat. No. 4,539,401 to Figlarz et al., and U.S. Pat. No. 5,759,230 to Chow et al. The preparations were made for comparison with the nanosized metals and metal oxides of this invention.

Table XX is a summary of the raw materials and experimental conditions used in the experiments. XRD and HRSEM data on the solids are presented in Table XXI.

TABLE XX

Reagents and Conditions Used in Examples 14A to 14I

| EX | METAL PRECURSOR | AMOUNT (g) | $HOC_2H_4OH$ (g) | °C./h |
|---|---|---|---|---|
| 14A | $Cu(OH)_2$* | 11.9 | 100.0 | 198° C./1.5 h |
| 14B | $Cu(OH)_2$* | 12.1 | 204.5 | 198° C./1.5 h |
| 14C | $Cu(OH)_2$* | 12.0 | 250.0 | 200° C./1.5 h |
| 14D | $Cu(OH)_2$* | 51.0 | 349.0 | 198° C./1.5 h |
| 14E | $Cu(OH)_2$^ | 14.2 | 203.4 | 170° C./14 h |
| 14F | $Cu(OOCCH_3)_2 \cdot H_2O$ | 10.0 | 136.0 | 175° C./2 h |
| 14G | CuO | 14.1 | 201.2+ | 175° C./16 h |
| 14H | $Ni(OH)_2$ | 21.9 | 351.2 | 180° C./75 h |
| 14I | $Co(OOCCH)_3$ | 10.49 | 252.6 | 195° C./1 h |

*$CU(OH)_2$ from Kocide Chemical Industries having 57 to 59 wt. % Cu
^$Cu(OH)_2$ from Bernard Chimie
+35.4 g Sorbitol was also added

TABLE XXI

Characterization of Solids from Examples 14A to 14I

| EX | XRD (2 θ° values) | HRSEM RESULTS |
|---|---|---|
| 14A | $Cu_2O$ (36.45), (42.28), (61.30) | |
| 14D | Primarily Cu with trace of $Cu_2O$ 36.62, (43.58), (50.55) | Two phases present. Porous agglomerates 150 nm–1.5μ. |
| 14E | Cu (43.58), (50.55) | Faceted particles 1–2μ, average 1.3μ. |
| 14F | Cu (43.47), (50.55) | Faceted particles 1–2μ, average 1.5μ. |
| 14G | Cu (43.58), (50.55) | Necked particles~23 nm |
| 14H | Ni (44.65), (52.04) | Bimodal distribution of particles 200–500 nm and 0.7–1.5μ. |
| 14I | Co (44.74) | 2–6μ porous spheres of aggregated nanoparticles. |

Examples 15A to 15E

These examples describe the preparation of nanosized copper oxides by the microwave assisted decomposition of $Cu(OH)_2$ in alkylated benzenes and polyaromatic hydrocarbons. Reactions were conducted in a computer controlled microwave oven, Model 10 from Microwave Materials Technologies, Inc., Oak Ridge, Tenn., operating at 2.45 gigahertz.

Table XXII lists the reaction mixtures investigated and the observations made.

Example 15A

The solid was heated at 10° C./min from 23° C. up to a set temperature of 270° C. The power usage was 730 Watts. The actual temperature of the solid was only 175° C.

Example 15B

The mixture was heated at 20° C./min. up to 220° C. The set point was reached in 10 minutes at a maximum power of 1250 Watts. It was maintained for 30 minutes. Color change from blue-green to black was evident after 5 minutes. More black product was formed during the next 25 minutes but there remained unconverted blue-green starting material when the experiment was terminated.

Example 15C

The mixture was heated to 280° C. at 20° C./min. The maximum temperature attained was 270° C. It was maintained for 30 minutes and the power usage was 1245 Watts.

Example 15D

The mixture was heated at 20° C./min. up to a set temperature of 280° C. Color changes were apparent above 160° C. The maximum temperature attained was 238° C. and the power usage was 1245 Watts.

Example 15E

The mixture was heated to 185° C. at a maximum power of 1250 Watts. Color change from blue-green to black was evident after about 10 minutes. After 25 minutes, the mixture appeared to be completely black. However, after filtration and washing with methanol, the solid was observed to have small amounts of unconverted starting material.

TABLE XXII

Microwave Assisted Experiments with KOCIDE ® $Cu(OH)_2$

| EXAMPLE | REACTION CONDITIONS | OBSERVATIONS AND RESULTS |
|---|---|---|
| 15A | 5 g $Cu(OH)_2$; no solvent | Some solid particles darkened. Most remained blue-green. |
| 15B | 5 g $Cu(OH)_2$ with 0.25 g DARCO ® G-60 activated carbon; no solvent | Mostly black solid with unconverted blue-green starting material. |
| 15C | 5 g $Cu(OH)_2$ with 50 g THERMINOL ® 59 | Color changed from green to dark between 200–210° C. |
| 15D | 5 g $Cu(OH)_2$ and 50 g NALKYLENE ® 500 | Color changed from green to dark at >160° C. |
| 15E | 5 g $Cu(OH)_2$ with 50 g NALKYLENE ® 500 and 0.25 g $NaH_2PO_4 \cdot 2H_2O$ | Solid product completely black after 25 minutes. |

The solids were analyzed by XRD and HRSEM. The powder pattern of the solid from Example 15A was not different from that of the original $Cu(OH)_2$. The solids from 15C and 15D were mixtures of CuO and $Cu_2O$ with an average particle size of about 25 nm. Peaks in the XRD spectrum of the solid from Example 15E were quite broad and consistent with superfine particle size. Copper (I) oxide, $Cu_2O$, was the only product detected.

The observations and data show that microwave assisted decomposition of copper (II) hydroxide occurred in the presence of the hydrocarbon solvents. Decomposition was more facile and complete when susceptors were employed. The solid reaction products were nanosized copper oxides. Dehydration to copper (II) oxide was the principal reaction between 160 to 190° C. Reduction to copper (I) oxide occurred at higher temperatures.

The present invention achieves the objects recited above. The method of the present invention provides nanosized metal compounds, particularly copper metal compounds, having an average particle size of less than 1000 nanometers, preferably less than 600 nanometers, more preferably less than 500 nanometers, and most preferably less than 100 nanometers. Total or progressive solubility of the metal precursor is not needed to successfully practice the present invention. The resulting metal compounds have great utility as catalysts or pigments.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A process for producing a solid nanosized member selected from the group consisting of nanosized metal, nanosized metal oxide, nanosized metal salt and mixtures thereof, said process comprising:
   (a) combining a hydrocarbon-insoluble metal compound with a hydrocarbon to provide a slurry, wherein the metal compound includes a metal selected from the group consisting of copper, nickel, tin, cobalt and mixtures thereof;
   (b) heating the slurry at a temperature and time effective to thermally decompose said metal compound to a solid nanosized member;
   (c) separating the hydrocarbon from the solid nanosized member; and
   (d) recovering the solid nanosized member.

2. A process for producing a solid nanosized member selected from the group consisting of nanosized metal, nanosized metal oxide, nanosized metal salt and mixtures thereof, said process comprising:
   (a) combining a hydrocarbon-insoluble metal compound with a hydrocarbon to provide a slurry, wherein the metal compound includes a metal selected from the group consisting of copper, nickel, tin, cobalt and mixtures thereof;
   (b) heating the slurry at a temperature and time effective to thermally decompose said metal compound to a solid nanosized member;
   (c) separating the hydrocarbon from the solid nanosized member;
   (d) recovering the solid nanosized member; and
   (e) recycling the hydrocarbon separated from the nanosized member for additional preparations of subsequent nanosized members.

3. The process of claim 1 wherein in step (a) said metal compound is selected from the group consisting of copper hydroxide, copper methoxide, copper formate, copper acetate, and mixtures thereof.

4. The process of claim 1 wherein in step (a) said metal compound is a metal oxide selected from the group consisting of hydroxides, carboxylates, alkoxides, and mixtures thereof.

5. The process of claim 1 wherein in step (a) the hydrocarbon is a member selected from the group consisting of alkylated benzenes, polyaromatic hydrocarbons, paraffins, and cycloparaffins.

6. The process of claim 1 wherein in step (b) said heating is at temperatures greater than about 150° C. for periods of 1 to 24 hours.

7. The process of claim 1 wherein in step (b) said heating is microwave assisted.

8. The process of claim 7 further including the step of adding susceptors having high dielectric loss tangents.

9. The process of claim 1 wherein in step (b) said heating said metal compound in the hydrocarbon further comprises reacting the metal compound with a reducing agent in said hydrocarbon.

10. The process of claim 1 wherein in step (b) said heating said metal compound in the hydrocarbon further comprises reacting the metal compound with at least one acid in said hydrocarbon.

11. The process of claim 1 wherein in step (c) said separating is performed by decanting, filtering, or centrifuging.

12. The process of claim 1 wherein the nanosized member produced in step (b) is a nanosized metal oxide which is converted to a nanosized metal salt by reacting the nanosized metal oxide with at least one acid in said hydrocarbon.

13. The process of claim 1 wherein steps (a), (b), and (c) are conducted batchwise or continuously.

14. A process of making nanosized copper or copper oxide comprising the steps of
   (a) providing a copper precursor selected from the group consisting of copper hydroxide, copper methoxide, copper formate, copper acetate, and mixtures thereof;
   (b) heating the copper precursor in a thermally stable hydrocarbon solvent at a temperature greater than about 150° C. for about 1 to about 24 hours; and
   (c) separating the nanosized copper or copper oxide from the hydrocarbon solvent, the nanosized copper or copper oxide having an average particle size of about 0.1 to about 600 nanometers.

15. The process of claim 14 wherein in step (b), the thermally stable solvent is selected from the group consisting of alkylated benzenes, polyaromatic hydrocarbons, paraffins, and cycloparaffins.

16. The process of claim 14 wherein in step (b), solubility of the copper precursor in the hydrocarbon solvent is unnecessary.

17. The process of claim 14 wherein in step (b), said heating is microwave assisted.

18. The process of claim 14 wherein steps (a), (b), and (c) are conducted batchwise or continuously.

19. The process of claim 14 further including the step of (d) recycling and reusing the hydrocarbon solvent.

20. A process for producing a solid nanosized member selected from the group consisting of nanosized metal, nanosized metal oxide, nanosized metal salt and mixtures thereof, said process comprising:
(a) heating a metal compound in a hydrocarbon at a temperature and time effective to convert said metal compound to a solid nanosized member;
(b) separating the hydrocarbon from the solid nanosized member; and
(c) recovering the solid nanosized member; and
(d) recycling the hydrocarbon separated from the nanosized member for additional preparations of subsequent nanosized members.

21. The process of claim 20 wherein in step (a) said metal compound is selected from the group consisting of copper hydroxide, copper methoxide, copper formate, copper acetate and mixtures thereof.

22. The process of claim 20 wherein in step (a) said metal compound is selected from the group consisting of hydroxides, carboxylates, alkoxides and mixtures thereof.

23. The process of claim 20 wherein in step (a) the hydrocarbon is a member selected from the group consisting of alkylated benzenes, polyaromatic hydrocarbons, paraffins and cycloparaffins.

24. The process of claim 20 wherein in step (a) said heating is at temperatures greater than about 150° C. for periods of 1 to 24 hours.

25. The process of claim 20 wherein in step (a) said heating is microwave assisted.

26. The process of claim 25 further including the step of adding susceptors having high dielectric loss tangents.

27. The process of claim 20 wherein in step (a) said heating said metal compound in the hydrocarbon further comprises reacting the metal compound with a reducing agent in said hydrocarbon.

28. The process of claim 20 wherein in step (a) said heating said metal compound in the hydrocarbon further comprises reacting the metal compound with at least one acid in said hydrocarbon.

29. The process of claim 20 wherein in step (b) said separating is performed by decanting, filtering, or centrifuging.

30. The process of claim 20 wherein the nanosized member produced in step (a) is a nanosized metal oxide which is converted to a nanosized metal salt by reacting the nanosized metal oxide with at least one acid in said hydrocarbon.

31. The process of claim 20 wherein steps (a), (b), and (c) are conducted batchwise or continuously.

32. The process of claim 20 wherein in step (a) said metal compound includes a member selected from the group consisting of copper, nickel, zinc, tin, cobalt and mixtures thereof.

* * * * *